United States Patent [19]

Nishiyama et al.

[11] Patent Number: 5,480,745

[45] Date of Patent: Jan. 2, 1996

[54] POROUS FILM AND USE OF THE SAME

[75] Inventors: Soji Nishiyama; Hiroyuki Higuchi; Kiichiro Matsushita; Ryoichi Matsushima, all of Osaka, Japan

[73] Assignee: Nitto Denko Corporation, Osaka, Japan

[21] Appl. No.: 381,395

[22] Filed: Jan. 31, 1995

[30] Foreign Application Priority Data

Jan. 31, 1994 [JP] Japan .................. 6-009318

[51] Int. Cl.⁶ .................................. H01M 2/16
[52] U.S. Cl. ................ 429/242; 429/254; 428/304.4
[58] Field of Search ................... 429/129, 142, 429/249, 254, 144, 145; 204/296; 428/304.4, 310.5, 316.6

[56] References Cited

U.S. PATENT DOCUMENTS

| | | | |
|---|---|---|---|
| 3,730,772 | 5/1973 | Stark | 429/254 |
| 3,841,943 | 10/1974 | Takashi et al. | |
| 4,109,066 | 8/1978 | Dick et al. | 429/249 X |
| 4,201,838 | 5/1980 | Goldberg | 429/254 X |
| 4,650,730 | 3/1987 | Lundquist et al. | 429/62 |
| 4,731,304 | 3/1988 | Lundquist et al. | 429/62 |
| 4,789,609 | 12/1988 | Ambrose-Ritchey et al. | 429/254 X |
| 4,863,792 | 9/1989 | Mrozinski | 428/315.5 |
| 4,877,679 | 10/1989 | Leatherman et al. | 428/224 |
| 5,320,916 | 6/1994 | Kishimoto et al. | 429/142 |
| 5,362,582 | 11/1994 | Chang et al. | 429/249 |
| 5,385,777 | 1/1995 | Higuchi et al. | 428/316 |

FOREIGN PATENT DOCUMENTS

| | | |
|---|---|---|
| 0565938 | 10/1993 | European Pat. Off. . |
| 62-10857 | 3/1987 | Japan ............ H01M 2/16 |
| 1186751 | 7/1989 | Japan ............ H01M 2/16 |
| 1258358 | 10/1989 | Japan ............ H01M 2/16 |
| 362449 | 3/1991 | Japan ............ H01M 2/16 |
| 4181651 | 6/1992 | Japan ............ H01M 2/16 |
| 4206257 | 7/1992 | Japan ............ H01M 2/16 |
| 1341630 | 12/1973 | United Kingdom . |
| 9313565 | 7/1993 | WIPO . |

*Primary Examiner*—Anthony Skapars
*Attorney, Agent, or Firm*—Sughrue, Mion, Zinn, Macpeak & Seas

[57] ABSTRACT

A porous film, a process for producing the same, a battery separator comprising the porous film, and a battery having incorporated therein the separator are disclosed. The porous film comprises a polyethylene and a polypropylene as the essential components, wherein the polyethylene content in the total weight of polyethylene and polypropylene is from 2 to 40% by weight and the polyethylene content is changed in the direction of the thickness of the film, and is produced by forming a laminate film comprising at least one polypropylene layer and at least one layer of a mixture of polyethylene and polypropylene as the essential components, the polyethylene content in the film being from 2 to 40% by weight, uniaxially stretching the laminate film at a low-temperature range of from −20° C. to 80° C. and then stretching the film at a high-temperature range of from 90° C. to 150° C.

9 Claims, 2 Drawing Sheets

POROUS FILM AND USE OF THE SAME

FIELD OF THE INVENTION

The present invention relates to a porous film containing polyethylene and polypropylene as the essential components, a process for producing the same, a battery separator comprising the porous film, and a battery having incorporated therein the separator.

BACKGROUND OF THE INVENTION

Various types of batteries are practically used but recently, as a battery for applicability to a cordless system of electronic instruments, a lithium battery which gives a high electromotive force and a high energy and causes small self-discharging has been watched with keen interest.

As a material for constituting a positive pole of the lithium battery, metal oxides such as a fluorinated graphite represented by $(CF_x)_n$, $MnO_2$, $V_2O_5$, CuO, $Ag_2CrO_4$, etc., and sulfides such as $TiS_2$, CuS, etc., are known, and as a material for constituting a negative pole thereof, metallic lithium, lithium alloys with other metals such as aluminum, materials having an ability of adsorbing or occluding a lithium ion, such as carbon or graphite, and conductive polymers doped with a lithium ion are known. Further, as an electrolytic solution, an organic solvent type electrolytic solution obtained by dissolving $LiPF_6$, $LiCF_3SO_3$, $LiClO_4$, $LiBF_4$, etc., as an electrolyte in an organic solvent such as ethylene carbonate, propylene carbonate, acetonitrile, γ-butyrolactone, 1,2-dimethoxyethane, tetrahydrofuran, etc., is known.

Where an abnormal electric current is passed trough the lithium battery constituted of the above-described materials by external short-circuiting, or an erroneous connection of the positive pole and the negative pole, the battery temperature is considerably raised with the passage of the electric current, which causes a possibility to give a thermal damage to the instrument having incorporated therein the lithium battery. Therefore, it is usual that the lithium battery includes several safety devices.

It is proposed that by increasing the electric resistance of a separator incorporated in the lithium battery to prevent the occurrence of short-circuiting of the positive and negative poles at the increase of the battery temperature caused by an abnormal electric current, the battery reaction is intercepted to prevent the excessive increase of the temperature, whereby the safety is secured.

The function of securing the safety to prevent the excessive increase of temperature by intercepting the battery reaction by the increase of the electric resistance at the increase of the temperature of the lithium cell as described above is generally called shut-down characteristics (hereinafter referred to as "SD characteristics"). The SD characteristics are the important characteristics of the separator, etc., for a lithium battery.

In addition, in the present invention, the temperature when the electric resistance is increased by the increase of a temperature and the value of the electric resistance reaches 200 Ω·cm² is hereinafter called "SD initiation temperature". Where the SD initiation temperature is too low, the increase of the electric resistance is initiated by a slight increase of a temperature, while where the SD initiation temperature is too high, there is the possibility that the safety is not sufficiently secured. At present, it is recognized that the practical SD initiation temperature is from about 100° C. to 145° C.

Furthermore, it is desired in the point of securing the safety that in the battery separator, the increased electric resistance is maintained at high temperature over the SD initiation temperature by the effect of the SD characteristics. The highest temperature at which the increased electric resistance is maintained is hereinafter called "heat resistant temperature". The heat resistant temperature can be considered to be a function of keeping the film form of the separator, and when the temperature is over the heat resistant temperature, the separator is melted and cannot keep the film form, whereby the electric resistance is reduced and the SD characteristic is lost.

Now, as a separator having the SD characteristics, for example, (a) a porous film on the surface of which a fusing material (i.e., a material having a melting point lower than that of the porous film) is interspersed as disclosed in JP-A-1-186751 and JP-A-3-62449 (the term "JP-A" as used herein means an "unexamined published Japanese patent application"), (b) a laminate porous film comprising a porous layer capable of changing into a substantially non-porous structure at a definite temperature and a layer capable of keeping the porous structure at the temperature as disclosed in JP-A-62-10857 and JP-A-4-181651, and (c) a porous film comprising a mixture of polyethylene (hereinafter referred to as "PE") and polypropylene (hereinafter referred to as "PP") as disclosed in JP-A-4-206257 are known.

The realizing mechanism of the SD characteristics in conventional separators is as follows. In the separator (a), when the temperature of a battery is over a definite value, the husing material on the separator is melted and the micropores of the porous film are clogged by the molten component, which results in increasing the electric resistance and the further increase of the temperature is prevented; in the separator (b), when the temperature of a battery is over a definite value, by changing one porous layer of the separator into a non-porous structure, the electric resistance is increased and the further increase of the temperature is prevented; and in the separator (c), when the temperature of a battery is over a definite value, PE in the separator is melted and the micropores of the porous film are clogged by the molten PE, which results in increasing the electric resistance and the further increase of the temperature is prevented.

Of the conventional separators described above, the separators of the type (a) have the possibility to decrease the safety by falling off of the fusing material from the surface of the porous film.

Further, of the separators of type (b), the separator described in JP-A-62-10857 is produced by the method of forming a laminate film comprising a layer of a resin mixed with a filler or a plasticizer and a layer of a resin which has a different melting point from that of the above resin, mixed with a filler and a plasticizer, and then immersing the laminate film in an organic solvent which does not dissolve the resins but dissolves the filler or the plasticizer in the resins, whereby the filler or the plasticizer in the film is extracted off to form a porous film. However, since this method uses an organic solvent, scattering by evaporation of the organic solvent is inevitable and hence there is a possibility of, as a matter of course, worsening the environment of the production site and giving bad influences on the natural environment.

On the other hand, in the separators of the type (b), since the separator described in JP-A-4-181651 is obtained by stretching a laminate film comprising a high-melting resin layer and a low-melting resin layer to form a porous film, there is no problem caused by the use of an organic solvent and the separator is preferable in this point.

Further, since the separators of the type (c) are obtained by stretching, there is no trouble caused by the use of an organic solvent as in the separator described in JP-A-4-181651 and the separators are preferable in the point.

However, the requirement for the improvement of the characteristics in the technical field is strong and the quick realization of the high performance of separators (lowering of an electric resistance, the improvement of the mechanical strength, etc.) is a pressing need.

SUMMARY OF THE INVENTION

Accordingly, one object of the present invention is to provide a porous film having a practical SD initiation temperature, a high safety, a low electric resistance, and a high mechanical strength, and which is suitable as a battery separator.

Another object of the present invention is to provide a process for producing the above-described porous film.

Still another object of the present invention is to provide a battery separator comprising the above-described porous film.

A further object of the present invention is to provide a battery having incorporated therein the separator.

As a result of various investigations to overcome the above-described problems in the conventional techniques, it has been found that in a porous film comprising a mixture of PE and PP, the above object can be attained by changing the content of PE in the direction of the thickness of the film. The present invention has been completed based on this finding.

According to the present invention, there is provided a porous film comprising PE and PP as the essential components, wherein the content of PE in the total weight of PE and PP is from 2 to 40% by weight and the content of PE is changed in the direction of the thickness of the film.

DETAILED DESCRIPTION OF THE INVENTION

Figure 1:
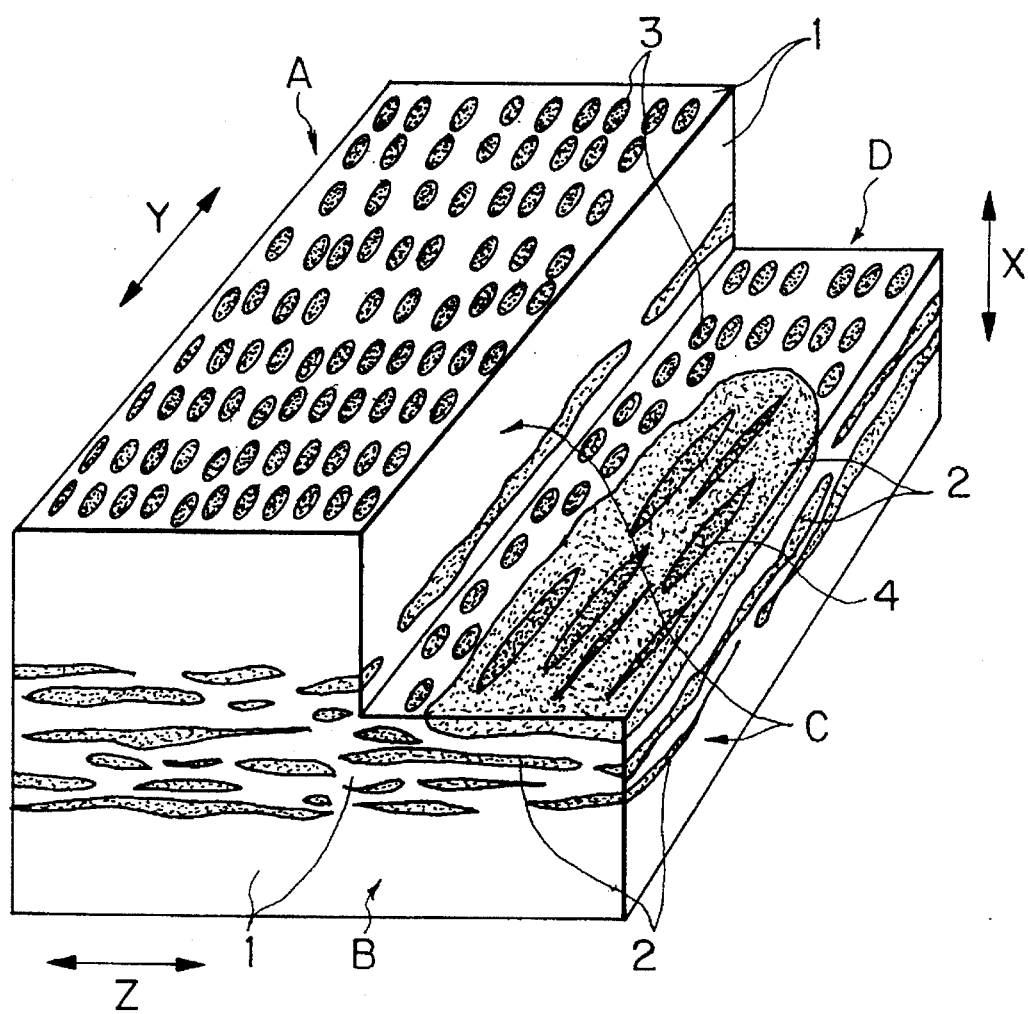
FIG. 1 is a schematic view showing one example of the fine structure of the porous film of the present invention.

The present invention is described in detail below.

The porous film of the present invention contains PE and PP as the essential components. The content of PE in the total weight of PE and PP which are the materials constituting the porous film is from 2 to 40% by weight, and preferably from 10 to 30% by weight, and the content of PP is from 60 to 98% by weight, and preferably from 70 to 90% by weight. If the content of PE is less than 2% by weight, the SD initiation temperature is increased to show the tendency of lowering the safety, while the content of the PE is over 40% by weight, the tendency of increasing the electric resistance and lowering the mechanical strength occurs undesirably. In addition, the thickness of the porous film is usually from about 10 to 50 μm but, as the case may be, the thickness thereof may be smaller or larger than the above value.

As described above, the porous film of the present invention contains PE and PP as the essential components, and it is important also in the present invention that the content of PE changes in the direction of the thickness of the film.

The modes of changing the PE content in the direction of the thickness of the porous film are (i) a mode that the PE content is low in one side part of the film and the PE content is high in the other side part of the film, (ii) a mode that the PE content is low near the surfaces of the film and the PE content is high in the center part in the direction of the thickness, and (iii) a mode that the PE content is high near the surfaces of the film and the PE content is low in the center part in the direction of the thickness.

As described above, the change of the PE content in the direction of the thickness of the film may be of the various modes, but it has been found that the PE content in the lowest PE content part is preferably from 0 to 20% by weight and the PE content in the highest PE content part is preferably from 21 to 60% by weight. In the preferred example thereof, the PE content near the surfaces of the film is from 0 to 20% by weight, and the PE content in the center part in the direction of the thickness of the film is from 21 to 60% by weight.

The PE content in the porous film of the present invention is explained below.

The PE content is the proportion of the PE weight in the sum of the weight (A) of PE and the weight (B) of PP constituting the porous film of the present invention, and can be calculated by the following equation (1).

$$PE \text{ Content} = \frac{A}{A+B} \times 100 \quad (1)$$

However, since in the porous film of the present invention, the PE content changes in the direction of the thickness of the film, as the case may be, it is not always easy to calculate the PE content through the whole film or the PE content in a specific part in the direction of the thickness of the film by the above equation (1). In such a case, after exposing the cross section of the porous film in the direction of the thickness thereof to the vapor of an aqueous solution of ruthenic acid, the cross section is observed by a transmission electron microscope (hereinafter referred to as "TEM"), the area (D μm$^2$) of the PE part (the part is dyed in a black color with ruthenic acid) having a size of 1 μm×1 μm in the area of the cross section is determined and the PE content may be calculated by the following equation (2). In the equation (2), E is the density of PE and F is the density of PP.

$$PE \text{ Content} = \frac{D \times E}{(D \times E) + (1-D) \times F} \times 100 \quad (2)$$

When the porous film described above is used as a battery separator, the battery can be constructed by interposing the porous film between the positive pole and the negative pole. In this case, the materials for the positive pole, the negative pole, the battery case, the electrolytic solution, etc., and the disposition structure of these elements may not be any specific ones and may be the same as those for the conventional battery.

When a temperature is raised by some causes during using such a battery, PE which is the constituting material of the porous film as the separator is melted and the micropores of the porous film are clogged by the molten components, which results in increasing the electric resistance, whereby the excessive increase of the temperature is prevented. In this case, however, when the porous film is composed of the parts without containing PE and the parts containing PE, the micropore clogging phenomenon occurs at the PE-containing parts and when the porous film is composed of parts having a high PE content and parts having a low PE content, clogging of the micropores with the molten PE simultaneously occurs at both the parts but clogging is completed fast at the parts having the high PE content and the completion of clogging at the parts having the low PE content is delayed than the former case.

The process for producing the porous film of the present invention is described. The process is a novel process developed by the present inventors, and comprises forming a laminate film comprising at least one PP layer and at least one layer of a mixture of PE and PP, the PE content in the laminate film being from 2 to 40% by weight, uniaxially stretching the laminate film at a low temperature range of from −20° C. to 80° C., and then stretching the film at a high temperature range of from 100° C. to 150° C.

In the process of the present invention, a laminate film comprising at least one PP layer and at least one layer of a mixture of PE and PP as the essential components is first formed. The laminate film is formed such that the PE content in the total weight of PE and PP which are the essential components is from 2 to 40% by weight. There is no particular restriction on PE used for forming the laminate film, and a low density PE, an intermediate density PE or a high density PE may be used. On the other hand, there is also no particular restriction on PP, and isotactic PP or atactic PP may be used. However, it has been found that in the case of desiring the porous film having a high porosity, isotactic PP is preferably used and in particular, isotactic PP containing at least 90% by weight (preferably at least 95% by weight) of the part which is not extracted with a boiling n-heptane is preferred.

The thickness of the laminate film can be appropriately selected, but from the easiness of stretching which is conducted later, the thickness is preferably from about 15 to 80 μm.

The PP layer or the layer of the mixture of PE and PP of the laminate film can contain, if desired and necessary, additives such as an antioxidant, an antistatic agent, a filler, etc., in appropriate amounts.

The formation of the laminate film can be carried out by a process of preparing PP and a mixture of PE and PP and simultaneously extruding them, a process of forming a film by extruding PP (or a mixture of PE and PP) and extruding a mixture of PE and PP (or PP) on the film, or a process of forming a film of PP and a film comprising PE and PP and then heat-welding these films.

According to these processes, a laminate film comprising the PE layer and the layer of a mixture of PE and PP, a laminate film comprising the layer of a mixture of PE and PP having formed on both the surfaces thereof the layer of PP, a laminate film comprising the PP layer having formed on both the surfaces the layer of a mixture of PE and PP, etc., can be obtained. The layer of a mixture of PE and PP in the laminate film may be a multilayer comprising at least two layers each having a different mixing ratio of PE and PP.

In the process of the present invention, a heat treatment is, if desired, applied to the laminate film. The heat treatment may be applied by an optional method and, for example, there are a method of contacting the laminate film with a heated roll or metal plate, a method of heating the laminate film in air or an inert gas, and a method of winding the laminate film around a core in a roll form and heating the roll-form film in a gas phase. In the case of winding the laminate film around a core material in a roll-form and heating the roll-form film in a gas phase, the laminate film can be wound by laminating a releasable sheet with the laminate film. Examples of the releasable sheet which can be used are a polyethylene terephthalate film, a fluorine resin film; a paper and a plastic film coated with a releasing agent such as a silicone resin or a fluorine resin; and the like.

The temperature and the time for the heat-treatment can be selected according to the manner of the heat-treatment, etc., but the temperature for the heat-treatment is preferably from about 100° C. to 160° C. and the time is preferably from about 2 seconds to 24 hours.

By applying such a heat-treatment, the crystallinity of the laminate film is increased and the micropores can be easily formed by subsequently stretching the heat-treated layer to obtain the porous film having a high porosity.

The laminate film thus obtained is then uniaxially stretched at a low temperature range of from −20° C. to 80° C. (preferably from 0° C. to 50° C.) (hereinafter, stretching at a temperature of from −20° C. to 80° C. is referred to as a "low-temperature stretching"). If the stretching temperature is lower than −20° C., it sometimes happens that breaking of the film occurs during working and if the stretching temperature is higher than 80° C., it is difficult to obtain the porous film. In addition, for the low-temperature stretching method, any specific method is unnecessary and a roll stretching method, a tenter stretching method, etc., which are conventionally known can be employed.

There is no particular restriction on the stretching ratio at low-temperature stretching but the stretching ratio is usually from about 20 to 400%, and preferably from about 40 to 300%.

The stretching ratio can be obtained by the following equation (3) using the length (L) of the laminate film before low-temperature stretching and the length (LB) of the film after low-temperature stretching.

$$\text{Stretching ratio} = \frac{LB - L}{L} \times 100 \qquad (3)$$

The laminate thus low-temperature stretched is then stretched at a high-temperature range of from 90° C. to 150° C. (hereinafter, stretching at a temperature of from 90° C. to 150° C. is referred to as a "high-temperature stretching"). The high-temperature stretching is carried out in the same stretching direction as the low-temperature stretching described above, but may be carried out in the other direction than the low-temperature stretching direction.

The reason of defining the temperature at the high-temperature stretching in the above-described range is the same as the reason defined above at the low-temperature stretching; that is, if the temperature is lower than 90° C., it sometimes happens that breaking of the film occurs and if the temperature is higher than 150° C., it is difficult to obtain the porous film. In addition, for the high-temperature stretching method, conventional methods as the low-temperature stretching can be employed.

There is also no particular restriction on the stretching ratio at the high-temperature stretching but the stretching ratio is usually from about 10 to 500%, and preferably from about 100 to 300%. The stretching ratio can be obtained by the following equation (4) using the length (L) of the laminate film before the low-temperature stretching, the length (LB) of the film after the low-temperature stretching (i.e., the length of the film before the high-temperature stretching), and the length (LH) after the high-temperature stretching.

$$\text{Stretching Ratio} = \frac{LH - LB}{L} \times 100 \quad (4)$$

The porous film thus obtained has the residual stress which acts at the low-temperature stretching or the high-temperature stretching, whereby the porous film shrinks in the stretched direction to easily cause a dimensional change and hence by shrinking the dimension of the film in the stretched direction after stretching, the dimensional stability of the film can be increased. The shrinking can be carried out, for example, under the heating condition as the stretching temperature. The extent of shrinking may be optional but usually is an extent such that the dimension of the film after stretching is reduced from about 10 to 40%.

Further, by applying a so-called "heat setting" of heating the film to the stretching temperature or to a temperature higher than the stretching temperature, while controlling such that the dimension in the stretched direction of the porous film is not changed, the dimensional stability can be improved as the case of applying the shrinking treatment described above.

As the matter of course, by applying both the heat setting and the shrinking treatment, the dimensional stability can also be improved.

In the above process, the laminate film comprising at least one PP layer and at least one layer of a mixture of PE and PP as the essential components is used but in the present invention, the laminate film comprising at least two layers each containing PE and PP as the essential components and having a different PE content to the total weight of PE and PP (i.e., having a different mixing ratio of PE and PP) can be used. In this case, the laminate film only is changed and other factors are the same as described above.

The fine structure of the porous film obtained by the process of the present invention can be observed by an electron microscope. For example, when the cross section of the porous film in the direction of the thickness is observed by TEM (the magnifications can be properly selected but are usually from about 10,000 to 50,000 magnifications), it can be seen that the PE part and the PP part each has each independent phase separation structure, the PP part existing as a continuous phase and the PE parts existing as a discontinuous phase. Further, the greatest characteristic of the porous film of the present invention is that the PE content changes in the direction of the thickness of the film; that is, the PE parts are not uniformly interspersed in the direction of the thickness of the film but are unevenly distributed. In addition, at the observation, it is better to dye the part to be observed by exposing the same to the vapor of an aqueous solution of ruthenic acid (in this case, since the PE part is dyed more black than the PP part, the PE part can be easily discriminated from the PP part).

FIG. 1 is a schematic view showing one example of the fine structure of the porous film obtained by applying the above-described process to the laminate film comprising the layer of a mixture of PE and PP having formed on both the surfaces thereof the PP layer.

In FIG. 1, the arrow X shows the direction of the thickness of the porous film, the arrow Y shows the stretched direction, and the arrow Z shows the direction perpendicular to the stretched direction Y. Further, A shows the surface of the porous film, B shows the cross section cut along the direction perpendicular to the stretched direction Y, C shows the cross section cut along the stretched direction Y, and D shows the cross section cut along the direction Z.

In the cross sections B, C, and D of the porous film, the PP parts 1 and the PE parts 2 each has a phase separation structure which exists independently each other, the PP parts 1 form a continuous phase and the PE parts form a discontinuous phase. The structure that the discontinuous phases are interspersed in the continuous phase as described above can be called a "sea-island structure". In addition, the PP parts 1 may be porous and PE parts may be porous or non-porous (having no micropores).

The greatest characteristic in the porous film is that in the direction of the thickness of the film, PE does not exist near the surfaces, PE exists only in the center part in the direction of the thickness, and the PE content changes in the direction of the thickness of the film.

The length of the PE portion 2 (the dimension of the direction Y) can be known by observing the cross section C and is usually from about 0.1 to several tens μm. The width of the PE part 2 (the dimension of the direction Z) can be known by observing the cross section B and is usually from about 0.2 to 5 μm. The thickness (the dimension of the direction X) of the PE part 2 can be known by observing the cross section C and is usually from about 0.1 to 2 μm.

The forms of the micropores 3 and 4 of the PP part 1 and the PE part (in the case of porous) 2 are mostly a long ellipse or a long rectangle. Further, the dimensions of the micropores in the PP parts are that the long diameter is generally from about 0.05 to 0.3 μm and the short diameter is generally from about 0.01 to 0.1 μm, and the fine pores 4 in the PE parts 2 are that the long diameter is generally from about 0.1 to 3 μm and the short diameter is generally from about 0.02 to 0.5 μm.

It has been confirmed that the electric resistance of the porous film thus obtained in an organic solvent-type electrolytic solution at a liquid temperature of 20° C. (hereinafter, this electric resistance is referred to as an "initial electric resistance") is low as lower than about 5 Ω·cm$^2$ per one film, the breaking strength is high as higher than about 3.8 kg/cm$^2$ and the SD initiation temperature is from about 100° C. to 145° C.

The porous film can be applied for various uses, in addition to a battery separator, such as a separation membrane, a gas permeable film for architecture, a gas permeable film for clothes, etc., as similar to the conventional porous films.

The present invention is explained in more detail by the following examples and comparative examples. In addition, in the following examples and comparative examples, all parts showing the mixing ratio of PE and PP are by weight.

EXAMPLE 1

Isotactic PP having a melt index (hereinafter referred to as "MI") of 2 and a mixture of 70 parts of PP having the same MI as above and 30 parts of high-density PE having MI of 1.3 were extruded by a two-layer simultaneous extruding method using a T die extruder at a die temperature of 230° C. to obtain a long laminate film composed of a PP layer having a thickness of about 16 μm and a mixed layer of PE and PP having a thickness of about 16 μm. The laminate film was then heat-treated by heating the film in air at a temperature of 150° C. for 5 minutes.

The heat-treated laminate film was low-temperature stretched in the lengthwise direction at a temperature of 25° C. such that the stretching ratio became 70% and then high-temperature stretched in the same direction at a temperature of 100° C. such that the stretching ratio became 130%. The dimension of the stretched direction was shrunk up to 20% at a temperature of 115° C. and further the film was heat-set by heating the film to 120° C. for 2 minutes, while controlling such that the dimension of the stretched direction did not change, thereby obtaining a porous film having a thickness of 24 μm and the initial electric resistance of 1.3 Ω•cm².

The PE content in the total weight of PE and PP of the porous film was 13% by weight. The PE content in the part of the laminate film up to about 12 μm from one surface to the center part of the direction of the thickness was 0% and the PE content in the part up to about 12 μm from the other surface to the center part in the direction of the thickness was 30% by weight, which showed that the PE content was changed in the direction of the thickness in the laminate film.

The SD initiation temperature, the heat-resistant temperature, and the breaking strength of the porous film were measured as follows, and the results obtained are shown in Table 1 below.

SD Initiation Temperature and Heat-Resistant Temperature

Figure 2:
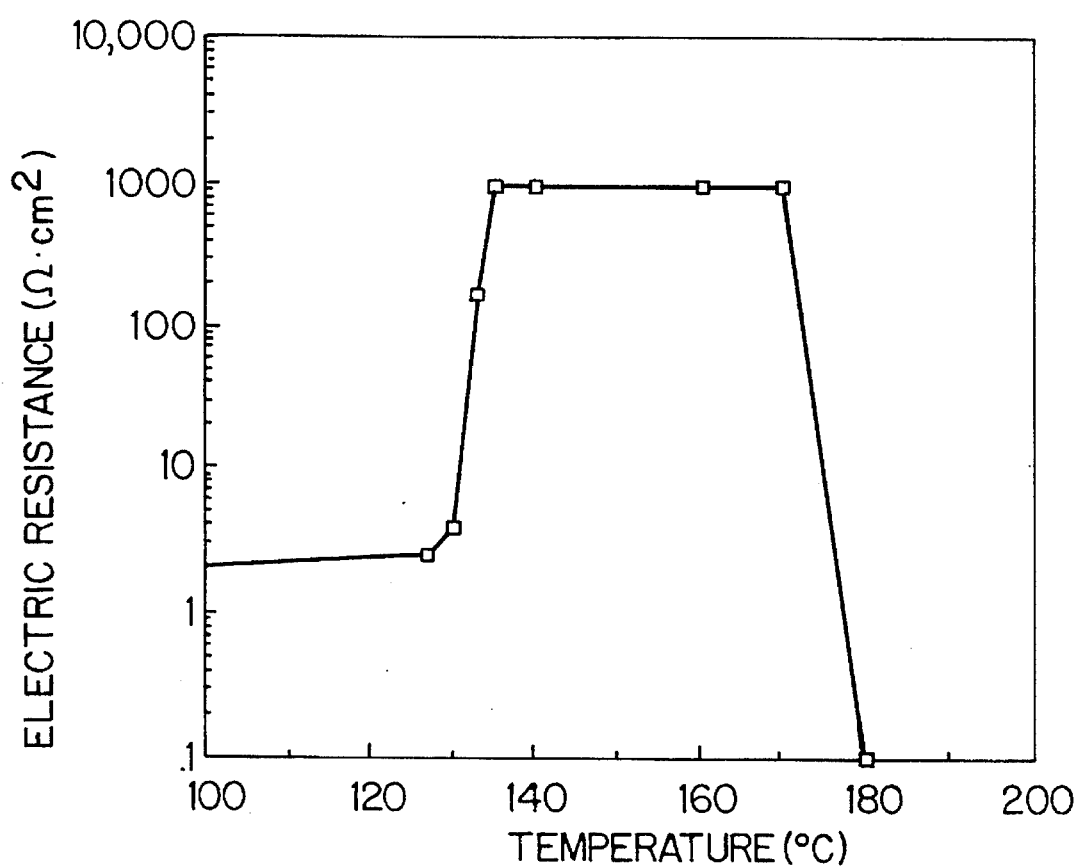
FIG. 2 is a graph showing one example of the SD characteristics of the porous film of the present invention.

Two sides of a porous film having a definite length in the stretched direction were fixed. The film was kept at each definite temperature for 15 minutes, and the electric resistance was then measured at room temperature. A graph (FIG. 2) showing the correlation of the temperature and the electric resistance was prepared, and from the graph, the SD initiation temperature and the heat-resistant temperature were determined.

The electric resistance was measured according to JIS C 2313. The electrolytic solution used was a solution obtained by dissolving 1 mole/liter of lithium perchlorate as an electrolyte in a mixed liquid of propylene carbonate and 1,2-dimethoxyethane in a same volume.

The alternating current resistance of 1 KHz was measured by an ohmmeter (LCR Meter KC-532, trade name, manufactured by Kokuyou Denki Kogyo K.K.) and the electric resistance R (Ω•cm²) of each porous film was calculated by the following equation (5). In the equation (5), RB is the electric resistance (Ω) of the electrolytic solution (at 20° C.), R is the electric resistance (Ω) of the porous film measured in the state of immersing the porous film in the electrolytic solution, and S is the cross sectional area (cm²) of the porous film.

$$R=(RB-R)\times S \quad (5)$$

Since the electric resistance measuring cell used in the measurement gives some leak electric current, the electric resistance of at most about 600 Ω•cm² only can be measured even in the case of measuring a non-porous film.

Breaking Strength

Each porous film was pulled in the stretched direction using a tension tester (Autograph AG-2000A, manufactured by Shimadzu Corporation) under the conditions of a chuck interval of 20 mm, a tensile speed of 200 mm/second, and a temperature of 25° C., and the strength at breaking was measured. The width of each measured sample was 10 mm.

TABLE 1

|  | SD Initiation Temperature (°C.) | Heat-Resistant Temperature (°C.) | Breaking Strength (kg/cm²) |
| --- | --- | --- | --- |
| Example 1 | 135 | 170 | 4.5 |
| Example 2 | 140 | 170 | 4.9 |
| Example 3 | 135 | 170 | 4.1 |
| Example 4 | 133 | 170 | 3.8 |
| Comparative Example 1 | 135 | 170 | 3.0 |
| Comparative Example 2 | 133 | 170 | 2.8 |
| Comparative Example 3 | 155 | 170 | 4.4 |

EXAMPLE 2

A laminate film composed of a layer (a thickness of about 10 μm) of a mixture of 70 parts of isotactic PP having MI of 0.5 and 30 parts of high-density PE having MI of 0.4, and each layer of isotactic PP having MI of 0.5 and a thickness of about 10 μm formed on both the surfaces of the mixed layer was formed by a three layer simultaneous extrusion method using a T die extruder (die temperature was set to 240° C.).

By successively applying the heat-treatment, the low-temperature stretching, the high-temperature stretching, the shrinking treatment, and the heat setting to the laminate film in the same manner as in Example 1, a porous film having a thickness of 24 μm and the initial electric resistance of 1.0 Ω•cm² was obtained.

The PE content in the total weight of PE and PP in the porous film was 7% by weight. Further, the PE contents in the porous film in the parts up to about 8 μm to the center part in the direction of the thickness from both the surfaces thereof each was 0% by weight, and the PE content in the center part (the thickness of the part was about 8 μm) in the direction of the thickness of the porous film was 30% by weight, which showed that the PE content in the porous film was changed in the direction of the thickness. The characteristics of the porous film are shown in Table 1 above.

EXAMPLE 3

A laminate film composed of a layer (thickness of about 13 μm) of a mixture of 60 parts having MI of 0.5 and 40 parts of high-density PE having MI of 0.4 and each layer (thickness of about 13 μm) of a mixture of 90 parts of isotactic PP having MI of 10.5 and 10 parts of high-density PE having MI of 0.4 formed on both the surfaces of the mixed layer was formed by a three-layer simultaneous extruding method using a T die extruder (the die temperature was set to 240° C.).

By successively applying the heat-treatment, the low-temperature stretching, the high-temperature stretching, the shrinking treatment, and the heat setting to the laminate film in the same manner as in Example 1, a porous film having a thickness of 25 μm and an initial electric resistance of 1.5 Ω•cm² was obtained.

The PE content in the total weight of PE and PP in the porous film was 17% by weight. Further, the PE contents in the parts of the porous film up to about 8 μm from both the surfaces thereof to the center part in the direction of the thickness each was 10% by weight and the PE content in the center part (the thickness of the part was about 8 μm) in the direction of the thickness was 40% by weight, which showed that the PE content of the porous film in the direction of the thickness was changed. The characteristics of the porous film are shown in Table 1 above.

EXAMPLE 4

A film having a thickness of 20 μm was obtained by extruding a mixture of 80 parts of isotactic PP having MI of 0.5 and 20 parts of high-density PE having MI of 0.4.

On the other hand, apart from this, a film having a thickness of 20 μm was obtained by extruding a mixture of 50 parts of isotactic PP having MI of 0.5 and 50 parts of high-density PE having MI of 0.4 using a T die extruder at a die temperature of 230° C.

The two films formed above were superposed on each other and a laminate film was obtained by passing the superposed films through a laminate roller adjusted to a temperature of 152° C.

By successively applying the heat-treatment, the low-temperature stretching, the high-temperature stretching, the shrinking treatment, and the heat setting to the laminate in the same manner as in Example 1, a porous film having a thickness of 25 μm and an initial electric resistance of 2.2 $\Omega \cdot cm^2$ was obtained.

The PE content in the total weight of PE and PP of the porous film was 35% by weight. Further, the PE content in the part up to about 12 μm from one surface of the porous film to the center part in the direction of the thickness was 20% by weight and the PE content in the part up to about 12 μm from the other surface of the porous film to the center part in the direction of the thickness was 50% by weight, which showed that the PE content of the porous film was changed in the direction of the thickness. The characteristics of the porous film are shown in Table 1 above.

COMPARATIVE EXAMPLE 1

A film having a thickness of 41 μm was obtained by extruding a mixture of 70 parts of isotactic PP having MI of 2.0 and 30 parts of high-density PE having MI of 1.3 using a T die extruder at a die temperature of 230° C.

By successively applying the heat-treatment, the low-temperature stretching, the high-temperature stretching, the shrinking treatment, and the heat setting to the laminate film in the same manner as in Example 1, a porous film having a thickness of 26 μm and an initial electric resistance of 1.5 $\Omega \cdot cm^2$ was obtained. The characteristics of the porous film are shown in Table 1 above. As shown in the results, the breaking strength of the porous film was low.

COMPARATIVE EXAMPLE 2

By following the same procedure as in Comparative Example 1 except that a mixture of 60 parts of PP and 40 parts of PE was used in place of the mixture in Comparative Example 1, a porous film having a thickness of 25 μm and an initial electric resistance of 1.8 $\Omega \cdot cm^2$ was obtained. The characteristics of the porous film are shown in Table 1 above. As shown in the results, the breaking strength of the porous film was further low.

COMPARATIVE EXAMPLE 3

By following the same procedure as in Comparative Example 1 except that a mixture of 87 parts of PP and 13 parts of PE was used in place of the mixture in Comparative Example 1, a porous film having a thickness of 24 μm and an initial electric resistance of 1.1 $\Omega \cdot cm^2$ was obtained. The characteristics of the porous film are shown in Table 1 above. As shown in the above results, the breaking strength of the porous film was high but the SD initiation temperature of the porous film was considerably high.

According to the process of the present invention, a porous film can be obtained by a simple operation and the porous film of the present invention has a high mechanical strength. Further, when the porous film is used as a battery separator, the film shows a practical SD initiation temperature and has the merit that the safety is high.

While the invention has been described in detail and with reference to specific embodiments thereof, it will be apparent to one skilled in the art that various changes and modifications can be made therein without departing from the spirit and scope thereof.

What is claimed is:

1. A porous film comprising a polyethylene and a polypropylene as the essential components, wherein the polyethylene content in the total weight of polyethylene and polypropylene is from 2 to 40% by weight and the polyethylene content is changed in the direction of the thickness of the film.

2. A porous film of claim 1, wherein in the direction of the thickness of the film, the polyethylene content in the lowest polyethylene content portion is from 0 to 20% by weight and the polyethylene content in the highest polyethylene content part is from 21 to 60% by weight.

3. A porous film of claim 2, wherein the polyethylene content near the surfaces thereof is from 0 to 20% by weight and the polyethylene content in the center part in the direction of the thickness of the film is from 21 to 60% by weight.

4. A battery separator comprising a porous film comprising polyethylene and polypropylene as the essential components, wherein the polyethylene content in the total weight of polyethylene and polypropylene is from 2 to 40% by weight and the polyethylene content is changed in the direction of the thickness of the film.

5. A battery separator of claim 4, wherein the porous film is such that in the direction of the thickness of the film, the polyethylene content in the lowest polyethylene content part is from 0 to 20% by weight and the polyethylene content in the highest polyethylene content part is from 21 to 60% by weight.

6. A battery separator of claim 4, wherein the porous film is such that the polyethylene content near the surfaces thereof is from 0 to 20% by weight and the polyethylene content in the center part in the direction of the thickness of the film is from 21 to 60% by weight.

7. A battery comprising a positive pole, a negative pole, a separator interposed between both the poles, and an electrolytic solution, wherein the separator is a porous film comprising polyethylene and polypropylene as the essential components, wherein the polyethylene content in the total weight of polyethylene and polypropylene is from 2 to 40% by weight and the polyethylene content is changed in the direction of the thickness of the film.

8. A battery of claim 7, wherein the separator is the porous film such that in the direction of the thickness of the film, the polyethylene content in the lowest polyethylene content part is from 0 to 20% by weight and the polyethylene content in the highest polyethylene content part is from 21 to 60% by weight.

9. A battery of claim 7, wherein the separator is the porous film such that the polyethylene content near the surfaces thereof is from 0 to 20% by weight and the polyethylene content in the center part in the direction of the thickness of the film is from 21 to 60% by weight.

* * * * *